United States Patent
Greene et al.

(10) Patent No.: US 9,538,120 B2
(45) Date of Patent: Jan. 3, 2017

(54) METHOD FOR IMPROVING OFFLINE CONTENT PLAYBACK

(71) Applicant: Google Inc., Mountain View, CA (US)

(72) Inventors: Kevin Greene, San Francisco, CA (US); Robert Christopher Gaunt, Pacifica, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/606,171

(22) Filed: Jan. 27, 2015

(65) Prior Publication Data
US 2015/0215571 A1 Jul. 30, 2015

Related U.S. Application Data

(60) Provisional application No. 61/933,144, filed on Jan. 29, 2014.

(51) Int. Cl.
*H04N 5/765* (2006.01)

(52) U.S. Cl.
CPC .................................... *H04N 5/765* (2013.01)

(58) Field of Classification Search
None
See application file for complete search history.

(56) References Cited

U.S. PATENT DOCUMENTS

| | | | |
|---|---|---|---|
| 2008/0086743 A1 | 4/2008 | Cheng et al. | |
| 2011/0082914 A1 | 4/2011 | Robert et al. | |
| 2012/0106932 A1 | 5/2012 | Grevers, Jr. | |
| 2012/0110628 A1 | 5/2012 | Candelore | |
| 2012/0216234 A1 | 8/2012 | Kemp | |
| 2013/0254611 A1* | 9/2013 | Amerga | H04N 19/895 714/746 |
| 2014/0297881 A1* | 10/2014 | Shivadas | H04L 67/2861 709/231 |
| 2015/0095460 A1* | 4/2015 | Berger | H04L 67/06 709/219 |

OTHER PUBLICATIONS

International Searching Authority, "Notification of Transmittal of the International Search Report and the Written Opinion of the International Search Authority, or the Declaration," for International Application No. PPCT/US2015/013268, mailed May 8, 2015, 9 pages.

* cited by examiner

*Primary Examiner* — Eileen Adams
(74) *Attorney, Agent, or Firm* — Lowenstein Sandler LLP

(57) ABSTRACT

In a method and system for offline content playback, a first plurality of portions of content streamed from a content sharing service for presentation by a media player is received. A request from a user to make the content available for offline playback is received, and in response to the request, a second plurality of portions of the content streamed from the content sharing service for presentation by the media player is stored. The first plurality of portions is requested and received from the content sharing service. The received first plurality of portions is stored, such that the first plurality of portions and the second plurality of portions are available for offline playback.

21 Claims, 5 Drawing Sheets

METHOD FOR IMPROVING OFFLINE CONTENT PLAYBACK

RELATED APPLICATIONS

This application claims priority to U.S. Provisional Application No. 61/933,144, filed Jan. 29, 2014, the entire contents of which are hereby incorporated by reference herein.

TECHNICAL FIELD

Aspects of the present disclosure relate to the field of content presentation and, more particularly, to a method for offline content playback.

BACKGROUND

On the Internet, content hosting websites or other applications, e.g., content sharing servers, allow users to upload, view, and share digital content. Such digital content may include audio clips, movie clips, TV clips, and music videos, as well as amateur content such as video blogging, short original videos, pictures, photos, etc. A viewer can then view the content that is streamed from a content sharing server to a viewer device for playback, where the quality of the streaming content can vary depending on the network connection of the viewer device. For example, the viewer device can request lower quality content if the connection speed is slow to prevent buffering that disrupts the playback of the content.

However, viewers may desire to have the content available, e.g., temporarily available, for viewing offline, e.g., without a connection to the Internet or another network. For example, a user may determine during the playback of certain content that the user would like to play the content again later or share the content with someone else when the user does not have access to the content sharing server. Further, a user would likely desire to have the highest quality content available for offline playback, because network conditions are not an issue when the content is not being streamed.

SUMMARY

In some implementations, a method for off-line content playback is presented. The method includes receiving a first plurality of portions of content streamed from a content sharing service for presentation by a media player, and receiving a request from a user to make the content available for offline playback. In response to the request, a second plurality of portions of the content streamed from the content sharing service for presentation by the media player is stored. The first plurality of portions is requested and received from the content sharing service. The received first plurality of portions is stored, such that the first plurality of portions and the second plurality of portions are available for offline playback.

In some implementations, a lower-quality portion of the first plurality of portions of the content and the stored second plurality of portion the content is identified; and, in response to identifying that the lower-quality portion of the content, a replacement portion with a higher quality is requested from the content sharing service.

In some implementations, the replacement portion with the higher quality is received and stored, wherein the replacement portion replaces the portion having the lower quality. The content is then made available for offline playback with the replacement portion. The lower-quality portion can be identified via a manifest.

The requesting of the first plurality of portions can be in response to a completion of the presentation of the second plurality of portions. If a connection to the content sharing service is interrupted before receiving the replacement portion with the higher quality, the content remains available for offline playback with the lower-quality portion. The request to make the content available for offline playback can be received after the presentation of the first plurality of portions.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
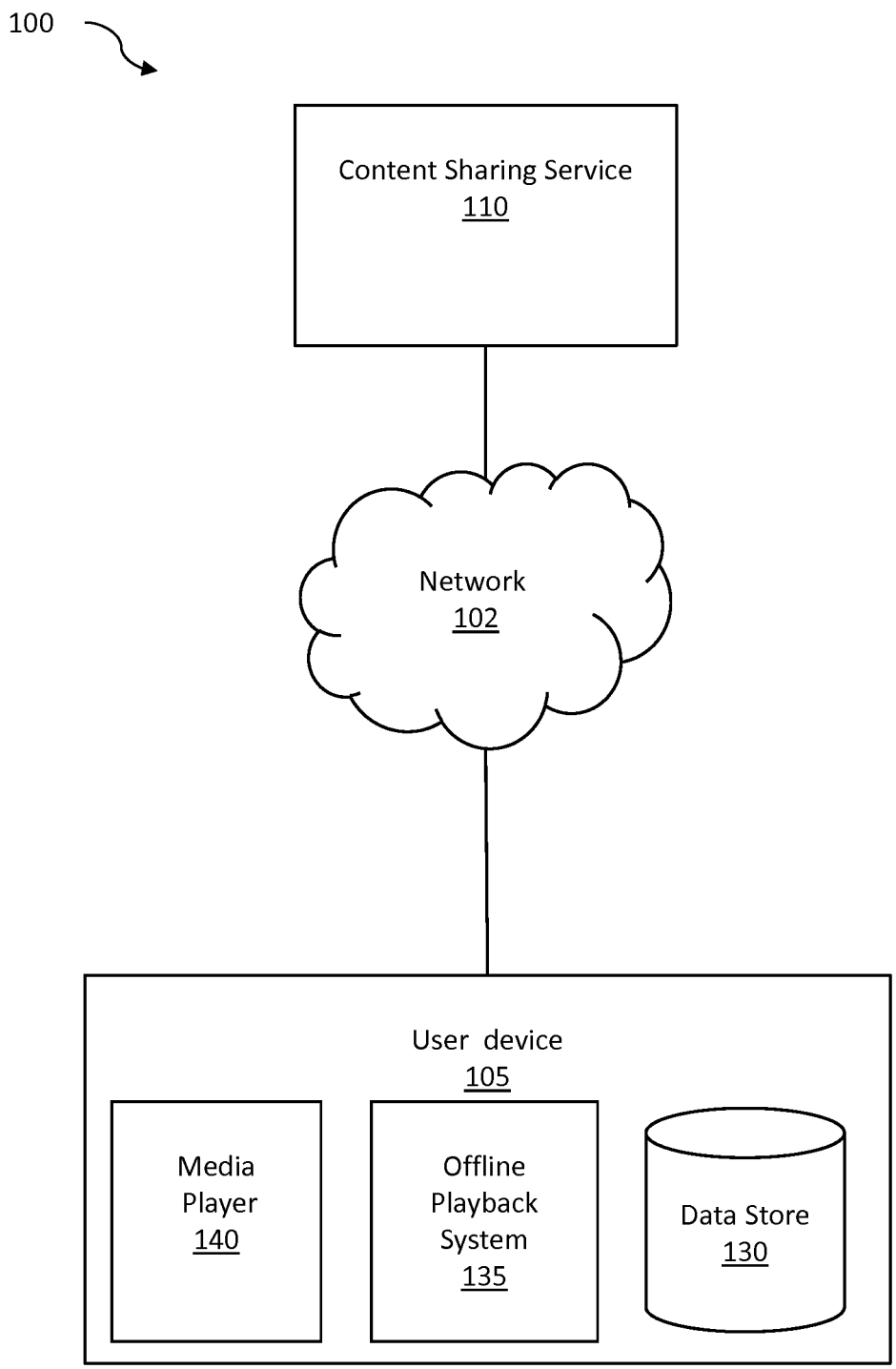
FIG. 1 illustrates exemplary system architecture, in accordance with one embodiment of the present disclosure.

Aspects of the disclosure pertain to a method for offline content playback, such as the playback of video or audio, when a user device is not connected to a content sharing service via a network. In some implementations, a method is provided that allows users to make streaming content from a content sharing service, such as audio or video content, available for offline playback, e.g., temporarily available for offline playback, so the content can be played later without a network or Internet connection. In an embodiment, the user can request that the content be made available for offline playback while the content is being streamed to the device of the user from the content sharing service. Upon receiving the user's request, the device of the user can download and store portions of the content while the user is viewing the streaming content. Once streaming of the content is finished, the device can request portions of the content that were streamed before the request and resulting storage of the content began. For example, the device can request these portions when a connection to the content sharing service is available. Once the device receives these portions of the content that were previously not stored on the device, the content can be made available for offline playback.

In an embodiment, during streaming of the content, the content may be streamed with an adaptive bitrate protocol, such as HTTP Live Streaming (HLS) or Dynamic Adaptive Streaming over HTTP (DASH), where the quality of the streaming content can be changed (e.g., to a lower quality which requires a lower bitrate for uninterrupted play) midstream depending on the network connection of the user device, such as network speed. The adaptive bitrate protocol helps to prevent buffering, which causes disruptions during playback. For example, when playing an HLS video, a user device can first download an HLS manifest file that includes a list of URLs of audio and video portions of various quality for the video. The portions can include small parts of the video, e.g., 10 seconds each. The user device can then select which quality portions to use based on a current network bandwidth. For example, if network conditions become degraded (e.g., due to disconnecting from WiFi), the user device can select to switch to a lower quality stream to prevent buffering. Subsequently, if the network connection improves (e.g., due to reconnecting to WiFi), then the user device can select to switch to a stream of high quality portions.

When a user desires to have content available offline, the user would generally like for the highest quality version of that content to be made available. However, if the user is playing the content while the content is being fetched for offline availability, a variable quality version of the content is originally fetched with some content portions possibly being low quality.

One example solution for improving the quality of the content available for offline playback is for the user device to wait until the user is finished watching the content, and then begin fetching high quality content portions for offline playback. This solution may increase the time the user has to wait in order to be able to play the video offline, and it may result in fetching the same content twice.

According to some aspects of the present disclosure, to improve the quality of the content available for offline playback, the user device can identify content portions that are not of the highest quality and request replacement portions of higher quality for the identified content portions. The user device can request replacement portions when a connection to the content sharing service is available. In other words, aspects of the present disclosure dynamically store content as the content is streamed, and later fetch higher quality portions of the content to replace low-quality portions that were stored.

In some implementations, a proxy server is run on the user device. A media player presenting content on the user device can request content portions through the proxy server, rather than directly from the content sharing service, such that content portions pass through the proxy server prior to reaching the media player. The proxy server can store the content portions in a local data store as the portions are received from the content sharing service before forwarding the portions to the media player. As a result, the portions can be stored in the data store for offline playback later.

Once the user stops playing the content, an offline playback component on the user device can start fetching portions that were not fetched by the proxy server during playback. Once those portions of the content have been fetched and the content is available for offline playback from the local data store, then the offline playback component can identify portions that are low-quality and request higher-quality versions as necessary.

If the network connection is interrupted before the offline playback component has completed the requesting and receiving of higher-quality portions, then the low-quality portions are still available for offline playback.

In other implementations, the media player itself stores the content portions (without using the proxy server). In yet some other implementations, instead of storing the content portions as they are fetched for the media player, the user device may use a separate lower-priority connection to download the high-quality content version in the background. The downloading via the lower-priority connection results in the high-quality content version to be available for offline playback without interrupting the original viewing of the content. In still some other implementations, portions of content can be pre-stored for offline playback. For example, a user could be shown a list of content, and the user device could store portions of each item selected by the user from the list of content, such that content display start-up time is reduced and the time required to make the content available for offline playback is reduced.

Aspects of the present disclosure provide a seamless offline playback experience that enables the user to view top quality content offline, where portions of content are stored as they are played in real time and higher quality versions of low-quality portions are later fetched as network conditions allow. As a result, the process of unnecessarily fetching the same content twice is avoided, and the time a user has to wait to be able to play the content offline is reduced.

FIG. 1 illustrates exemplary system architecture 100, in accordance with one embodiment of the present disclosure. System 100 includes a user device 105, with a data store 130, in communication with (e.g., coupled to) a content sharing service 110. The network 102 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The user device 105 and content sharing service 110 may be any type of computing device, for example, a device including a processor, a computer-readable medium, and a memory. The content sharing service 110 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices.

In some embodiments, the user device 105 may be executing a browser application or other application adapted to communicate over Internet related protocols (e.g., TCP/IP and HTTP) and/or display a user interface.

The user device 105 can include a media player 140. In one implementation, the media player 140 may be an application that allows a user to view content, such as images, videos, web pages, documents, etc. For example, the media player 140 may be a web browser that can access, retrieve, present, and/or navigate content (e.g., web pages such as Hyper Text Markup Language (HTML) pages, digital media items, etc.) served by a web server. The media player 140 may render, display, and/or present the content to a user. The media player 140 may also be an embedded media player (e.g., a Flash® player or an HTML5 player) that is embedded in a web page (e.g., a web page that may provide information about a product sold by an online merchant). In another example, the media player 140 may be a standalone application that allows users to view digital media items (e.g., digital videos, digital images, electronic books, etc.). The media player 140 may be provided to the user devices 105 by the content sharing server 110. For example, the media player 140 may be an embedded media player that is embedded in web pages provided by the content sharing service 110. In another example, the media player 140 may be an application that is downloaded from another system.

In one embodiment, the content sharing service 110 provides content including media items (e.g., digital video, streaming video, images, digital music, streaming music, social media information, digital images, photographs, etc.)

to the user device 105. For example, the content sharing service 110 may provide a media item, such as a streaming video, requested by a user for playback on the user device 105 via the network 102.

Data store 130 can include one or more writable persistent storage devices, such as memories, tapes or disks. Although the user device 105 and the data store 130 are depicted in FIG. 1 as implemented together in a single device, these components may be single, disparate components, or be networked in various combinations of multiple different devices that operate together. Examples of devices may include, but are not limited to, servers, mainframe computers, networked computers, process-based devices, and similar type of systems and devices.

The user device 105 can include an offline playback system 135 to facilitate offline playback of content. A user of user device 105 can select to view streaming content, such as video content or audio content, from the content sharing service 110 on media player 140. While the user is viewing the content in real time, the user can request that the content be available to the user offline. For example, the user would like for the content to be available on the user device 105 at a later time without having a connection to the content sharing service 110. In an embodiment, the content is only available temporarily, e.g., for a predetermined time period such as 24 hours. Alternatively, the content can remain available to the user on the user device 135 long term but the user can remove the content from the user device at any time. The duration of storing the content for offline playback can be predefined or configurable and can be short term or long term.

In response to the request to make the content available for offline playback, the offline playback system 135 begins to cache or store portions of the content that are received subsequent to the request. The offline playback system 135 can store these portions in data store 130, which can be a local data store of the user device 105. The offline playback system 135 can continue to store the remainder of the portions of the content in the data store 130 as the portions are streamed to the user device 105 for playback by the media player 140.

In an embodiment, once streaming of the portions of the content is complete, the offline playback system 135 requests, from the content sharing service 110, portions of the content that were not stored in the data store 130. For example, the offline playback system 135 may request portions of the content that were streamed prior to the user's request to make the content available for playback offline, because the offline playback system 135 was not yet storing the content prior to the user's request. The offline playback system 135 then receives these requested portions (i.e., the missing portions) from the content sharing service 110 and stores these requested portions in the data store 130. Once the offline playback system 135 has stored the requested portions of the content along with the portions of the content that were stored during streaming of the content, the content is made available for the user to playback the content offline.

In an embodiment, the offline playback system 135 can also identify low-quality portions of the content stored during streaming. For example, some of the portions of the content may have been low-quality portions because the connection to the content sharing system 110 during the streaming of those portions was poor. Other portions of the content may have been high-quality portions because the connection to the content sharing system 110 during the streaming of those portions was good. For each of the low-quality portions (e.g., portions that are not of the highest quality available), the playback system 135 can then request, from the content sharing service 110, higher-quality portions (e.g., the highest quality portions available).

Once the offline playback system 135 has received these requested portions, the offline playback system 135 can then replace the low-quality portions with the received high-quality portions. After the offline playback system 135 has replaced the low-quality portions with the high-quality portions, a high-quality version of the content is available for offline playback by the user. However, if a network connection is not available for the offline playback system to request the replacement portions or replacement of the low-quality portions has not yet occurred, the user is still able to play a low-quality version of the content, or a version of the content with lower-quality portions.

Figure 2:
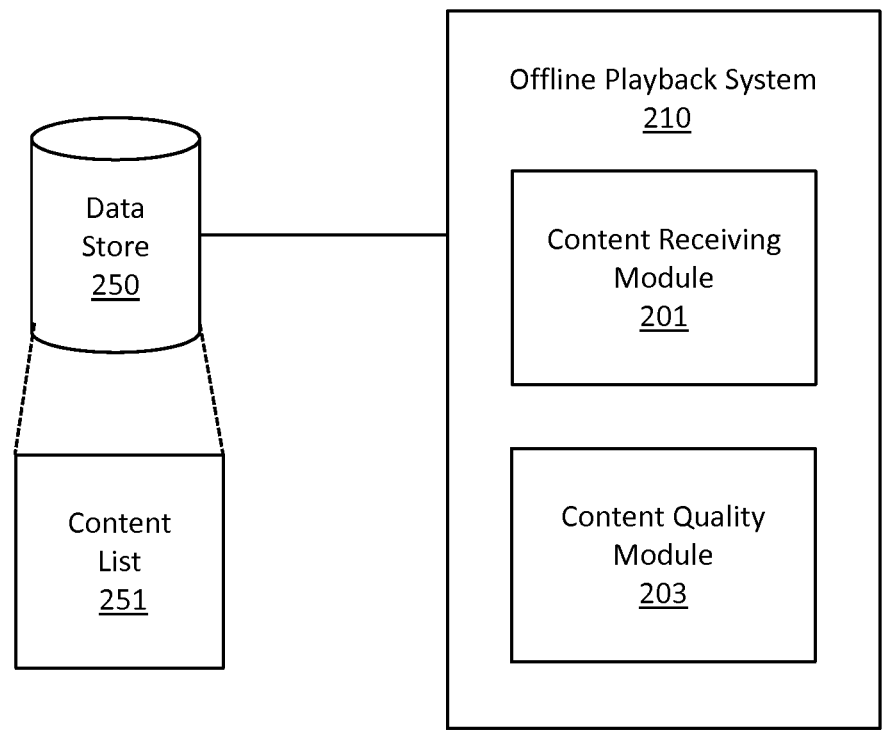
FIG. 2 illustrates a offline playback system, in accordance with one embodiment of the present disclosure.

FIG. 2 illustrates an offline playback system 210, in accordance with one embodiment of the present disclosure. The offline playback system 210 may include a content receiving module 201 and a content quality module 203. More or less components may be included in the offline playback system 210 without loss of generality. In an embodiment, offline playback system 210 is offline playback system 135 and data store 250 is data store 130 shown in FIG. 1.

In an embodiment, in response to a user request to make streaming content available for offline playback on a user device, the content receiving module 201 stores portions of the content that are subsequently streamed to a content list 251 in data store 250. For example, streaming content from a content sharing service is being presented to the user on the user device when the user selects to make the content available for offline playback. The content receiving module 201 receives the request, and stores portions that are streamed after the request, while the streaming content continues to be presented to the user.

Upon completion of the streaming of the content, the content receiving module 201 requests that the content sharing service send portions that were streamed prior to the request, according to an embodiment. For example, the portions of the content that were streamed prior to the request were not stored in the content list 251, because the user had not requested that the content be made available for offline playback. Once the content receiving module 201 receives the requested portions (i.e., the missing portions), the content receiving module 201 stores these requested portions in the content list 251 of the data store 250. The content can now be made available for the user for offline playback. The data store 250 can be a database or any other repository. Alternatively, the content portions can be stored on the file system using the content name as the file name (or part of the file name), and can be looked up using the content name.

The content receiving module 210 can be a proxy server discussed above. Alternatively, the content receiving module 210 can be part of the media player.

In an embodiment, after the portions are stored in content list 251 (e.g., substantially all or all of the portions of the content), the content quality module 203 can identify low-quality portions of the stored content. For example, the content quality module 203 can identify low-quality portions of the stored content using a manifest file (e.g., an HLS manifest file) downloaded to the user device prior to the content. The manifest file can include a list of URLs of content portions of various quality. The content quality module 203 can determine that a portion is low-quality if the manifest file includes a URL of a higher quality version for the same content portion.

For each low-quality portion, the content quality module 203 requests a high-quality portion from the content sharing service (e.g., using a respective URL from the manifest file) to replace the low-quality portion. Once the replacement high-quality portions have been received, the content receiving module 201 stores these portions in the content list 251, where the low-quality portions are replaced with the high-quality portions. However, if some or all of the high-quality portions are not available (e.g., due to a poor connection), then the content remains available for offline playback by the user, but with some of the portions being of low-quality.

Figure 3:
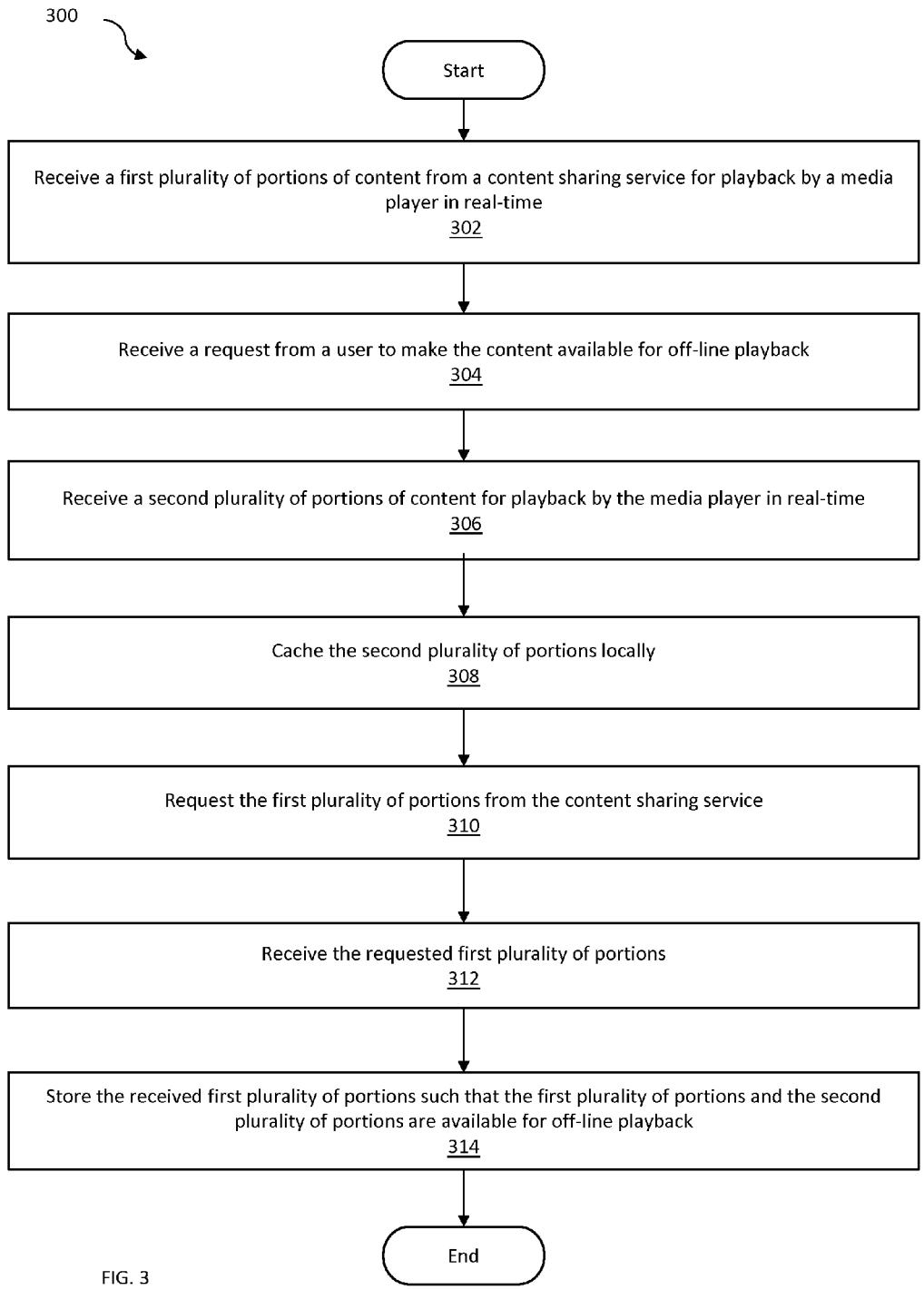
FIG. 3 is a flow diagram illustrating one embodiment for a method for offline content playback.

FIG. 3 is a flow diagram illustrating an embodiment of a method 300 for offline content playback. The method 300 may be performed by processing logic that may include hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, the method 300 is performed by a user device (e.g., the user device 105 of FIG. 1).

At block 302, processing logic receives a first plurality of portions of content from a content sharing service for playback by the media player in real-time. At block 304, processing logic receives a request from a user to make the content available for offline playback. For example, a user requests that content be made available for offline playback while the streaming content is being presented on a user device in real-time and after some portions of the content have already been presented or played back.

At block 306, processing logic receives a second plurality of portions of the content for playback by the media player in real-time. At block 308, processing logic stores the second plurality of portions locally. For example, in response to the user's request, portions of the content presented subsequent to the request are also stored locally on the user device.

At block 310, processing logic requests the first plurality of portions from the content sharing service. At block 312, processing logic receives the requested first plurality of portions. At block 314, processing logic stores the received first plurality of portions such that the content, including the first plurality of portions and the second plurality of portions, is available for offline playback. For example, the portions of the content that were streamed and displayed prior to the user's request are requested and then stored when received, such that the content is available for offline playback by the user.

In an embodiment, the first plurality of portions of the content is stored as the first plurality of portions is streamed from the content sharing service. For example, the first plurality of portions can be stored in random access memory when the request to make the content available for offline playback is received, and then copied to a local store after the request to make the content available for offline playback is received. The first plurality of portions can be discarded from the random access memory when the presentation of the second plurality of portions is completed.

Figure 4:
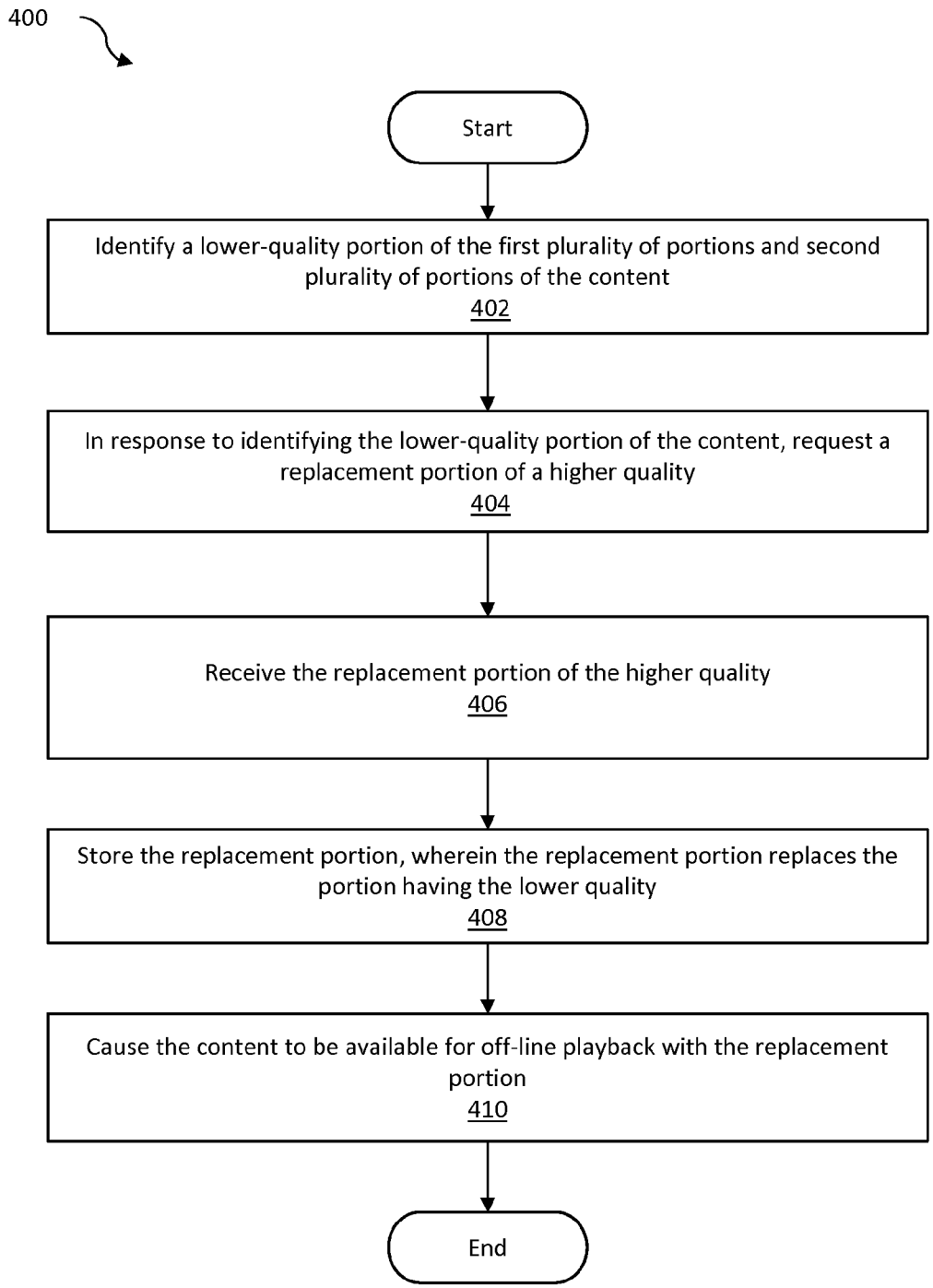
FIG. 4 is a flow diagram illustrating one embodiment for another method for offline content playback.

FIG. 4 is a flow diagram illustrating an embodiment of a method 400 for offline content playback. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 300 is performed by a user device (e.g., the user device 105 of FIG. 1).

At block 402, processing logic identifies lower-quality portions of the stored first plurality of portions and second plurality of portions of the content. At block 404, in response to identifying a lower-quality portion of the content, processing logic requests a replacement portion having a higher quality. For example, because the portions of the content were being streamed, some of the portions may be of a lower quality due to a poor connection to the content sharing service. Therefore, higher-quality replacement portions are requested for any lower-quality portions. These replacement portions can be requested when the connection between the user device and the content sharing service is sufficiently good.

At block 406, processing logic receives the replacement portion of a higher quality. At block 408, processing logic stores the replacement portion, wherein the replacement portion replaces the portion having a lower quality. Once the higher-quality replacement portions are received, the lower-quality portions are replaced with the higher-quality replacement portions.

At block 410, processing logic causes the content to be available for offline playback with the replacement portion. Once the higher-quality replacement portions have replaced the lower-quality portions, the user then can play the content offline, where the content is of a higher quality than the content that was streamed to the user device.

Figure 5:
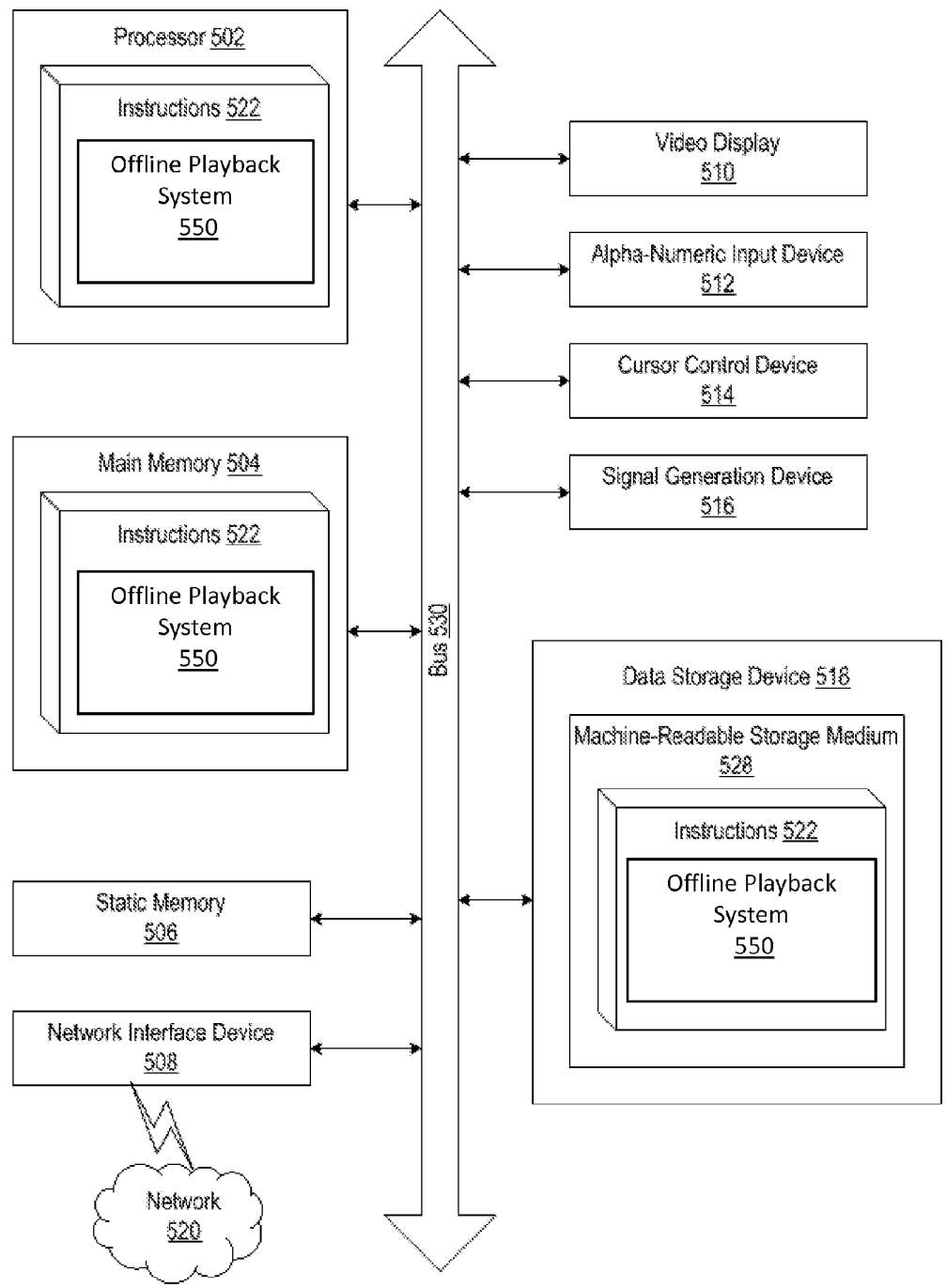
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium (or computer-readable storage medium) 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 516 via the network interface device 508.

In one embodiment, the instructions 522 include instructions for an offline playback system 550, which may correspond to offline playback system 135 of FIG. 1, and/or a system for offline playback. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" or "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A method comprising:
receiving, by a processing device in a computer system, a first plurality of portions of a stream of content being streamed from a content sharing service to the computer system for playback by a media player at the computer system;
receiving, by the processing device, a request to make the stream of content available for offline playback at the computer system, wherein the request is received while the stream of content is being streamed from the content sharing service to the computer system and during playback of the stream of content by the media player, wherein the first plurality of portions is streamed from the content sharing service to the computer system prior to receipt of the request to make the stream of content available for offline playback, and wherein the first plurality of portions was not stored for offline playback at the computer system prior to receipt of the request to make the stream of content available for offline playback;

in response to receipt of the request to make the stream of content available for offline playback, storing, by the processing device, a second plurality of portions of the stream of content at the computer system as the second plurality of portions is being streamed from the content sharing service to the computer system for playback by the media player, and requesting, by the processing device, the first plurality of portions from the content sharing service;

receiving, by the processing device, the requested first plurality of portions from the content sharing service; and storing, by the processing device, the received requested first plurality of portions at the computer system, wherein the received requested first plurality of portions and the second plurality of portions are made available for offline playback at the computer system.

2. The method of claim 1 further comprising:

identifying an initial portion of the first plurality of portions or the stored second plurality of portions at the computer system as having a low quality; and in response to identification of the initial portion as having the low quality, requesting from the content sharing service a replacement portion of the stream of content for the initial portion that is of a higher quality than the initial portion.

3. The method of claim 2 further comprising:

receiving the replacement portion from the content sharing service;

storing the replacement portion at the computer system, wherein the replacement portion replaces the initial portion; and causing the stream of content to be available for offline playback with the replacement portion.

4. The method of claim 2, wherein the initial portion is identified as having the low quality based on a manifest file of the stream of content.

5. The method of claim 2, wherein, while a connection to the content sharing service is interrupted before receipt of the replacement portion, the stream of content remains available for offline playback with the initial portion.

6. The method of claim 1, wherein requesting the first plurality of portions is further in response to completion of the playback of the second plurality of portions.

7. The method of claim 1, wherein the request to make the stream of content available for offline playback is received after the playback of the first plurality of portions.

8. A non-transitory computer readable storage medium having instructions that, when executed by a processing device in a computer system, cause the processing device to:

receive a first plurality of portions of a stream of content being streamed from a content sharing service to the computer system for playback by a media player at the computer system, wherein the first plurality of portions is stored as the first plurality of portions is being streamed from the content sharing service to the computer system;

receive a request to make the stream of content available for offline playback at the computer system, wherein the request is received while the stream of content is being streamed from the content sharing service to the computer system and during playback of the stream of content by the media player, wherein the first plurality of portions is streamed from the content sharing service to the computer system prior to receipt of the request to make the stream of content available for offline playback, and wherein the first plurality of portions was not made available for offline playback at the computer system prior to receipt of the request to make the stream of content available for offline playback; and in response to receipt of the request to make the stream of content available for offline playback, store, by the processing device, a second plurality of portions of the stream of content at the computer system as the second plurality of portions is being streamed from the content sharing service to the computer system for playback by the media player, and copying, by the processing device, the stored first plurality of portions to a local store at the computer system, wherein the copied first plurality of portions and the second plurality of portions are made available for offline playback at the computer system.

9. The non-transitory computer readable storage medium of claim 8, wherein the processing device is further to:

identify an initial portion of the first plurality of portions or the stored second plurality of portions at the computer system as having a low quality; and in response to identification of the initial portion as having the low quality, request from the content sharing service a replacement portion of the stream of content for the initial portion that is of a higher quality than the initial portion.

10. The non-transitory computer readable storage medium of claim 9, wherein the processing device is further to:

receive the replacement portion from the content sharing service;

store the replacement portion at the computer system, wherein the replacement portion replaces the initial portion; and cause the stream of content to be available for offline playback with the replacement portion.

11. The non-transitory computer readable storage medium of claim 9, wherein the initial portion is identified as having the low quality based on a manifest file of the stream of content.

12. The non-transitory computer readable storage medium of claim 9, wherein, while a connection to the content sharing service is interrupted before receipt of the replacement portion, the stream of content remains available for offline playback with the initial portion.

13. The non-transitory computer readable storage medium of claim 8, wherein the first plurality of portions are stored in a random access memory when the request to make the stream of content available for offline playback is received.

14. The non-transitory computer readable storage medium of claim 13 wherein the processing device is further to:

discard the first plurality of portions from the random access memory in response to completion of the playback of the second plurality of portions.

15. The non-transitory computer readable storage medium of claim 8, wherein the request to make the stream of content available for offline playback is received after the playback of the first plurality of portions.

16. A computer system comprising:
a memory; and
a processing device to communicate with the memory to:
- receive a first plurality of portions of a stream of content being streamed from a content sharing service to the computer system for playback by a media player at the computer system;
- receive a request to make the stream of content available for offline playback at the computer system, wherein the request is received while the stream of content is being streamed from the content sharing service to the computer system and during playback of the stream of content by the media player, wherein the first plurality of portions is streamed from the content sharing service to the computer system prior to receipt of the request to make the stream of content available for offline playback, and wherein the first plurality of portions was not stored for offline playback at the computer system prior to receipt of the request to make the stream of content available for offline playback;
- in response to receipt of the request to make the stream of content available for offline playback, store a second plurality of portions of the stream of content at the computer system as the second plurality of portions is being streamed from the content sharing service to the computer system for playback by the media player, and request the first plurality of portions from the content sharing service;
- receive the requested first plurality of portions from the content sharing service; and
- store the received requested first plurality of portions at the computer system, wherein the received requested first plurality of portions and the second plurality of portions are made available for offline playback at the computer system.

17. The computer system of claim 16, wherein the processing device is further to:
- identify an initial portion of the first plurality of portions or the stored second plurality of portions at the computer system as having a low quality; and
- in response to identification of the initial portion as having the low quality, request from the content sharing service a replacement portion of the stream of content for the initial portion that is of a higher quality than the initial portion.

18. The computer system of claim 17, wherein the processing device is further to:
- receive the replacement portion from the content sharing service;
- store the replacement portion at the computer system, wherein the replacement portion replaces the initial portion; and
- cause the stream of content to be available for offline playback with the replacement portion.

19. The computer system of claim 17, wherein the initial portion is identified as having the low quality based on a manifest file of the stream of content.

20. The computer system of claim 17, wherein, while a connection to the content sharing service is interrupted before receipt of the replacement portion, the stream of content remains available for offline playback with the initial portion.

21. The computer system of claim 16, wherein the processing device is to request the first plurality of portions further in response to completion of the playback of the second plurality of portions.

* * * * *